United States Patent
Pryor, Jr. et al.

(10) Patent No.: US 7,959,347 B2
(45) Date of Patent: Jun. 14, 2011

(54) DURABILITY MONITORING AND IMPROVEMENT OF A BLENDER

(75) Inventors: Ernest B. Pryor, Jr., Maidens, VA (US); Steven W. Ashworth, Richmond, VA (US)

(73) Assignee: Hamilton Beach Brands, Inc, Glen Allen, VA (US)

( * ) Notice: Subject to any disclaimer, the term of this patent is extended or adjusted under 35 U.S.C. 154(b) by 0 days.

(21) Appl. No.: 12/983,371

(22) Filed: Jan. 3, 2011

(65) Prior Publication Data
US 2011/0096619 A1    Apr. 28, 2011

Related U.S. Application Data

(60) Division of application No. 11/682,022, filed on Mar. 5, 2007, and a continuation of application No. 12/795,173, filed on Jun. 7, 2010.

(51) Int. Cl.
*B01F 13/04* (2006.01)
*B01F 7/00* (2006.01)

(52) U.S. Cl. ......... 366/142; 366/206; 366/601; 388/936

(58) Field of Classification Search ............... 366/206, 366/142, 601; 388/936, 934
See application file for complete search history.

(56) References Cited

U.S. PATENT DOCUMENTS

| | | |
|---|---|---|
| 1,449,458 A | 3/1923 | Sutermeister |
| 1,476,167 A | 12/1923 | Mitchell |
| 1,756,286 A | 4/1930 | Farrall et al. |
| 1,932,018 A | 10/1933 | Hubbell, Jr. |
| D104,289 S | 4/1937 | Osius |
| D123,509 S | 11/1940 | Poplawski |
| 2,284,155 A | 5/1942 | Landgraf |
| D168,674 S | 1/1953 | Collura |
| D173,534 S | 11/1954 | Morgan |
| D181,541 S | 11/1957 | Madi et al. |
| D193,883 S | 10/1962 | Clemente et al. |
| D195,241 S | 5/1963 | Chapman et al. |
| D201,169 S | 5/1965 | Rawson |

(Continued)

FOREIGN PATENT DOCUMENTS
GB        2324380 A    10/1998

OTHER PUBLICATIONS

Office Action Issued Jun. 8, 2010 in U.S. Appl. No. 11/682,022 , 8 pages.

(Continued)

*Primary Examiner* — Tony G Soohoo
(74) *Attorney, Agent, or Firm* — Alexander D. Raring

(57) ABSTRACT

A blender for blending foodstuff includes a base enclosing a motor and having an upper mounting surface. A jar sensor is secured to the base proximate the upper mounting surface and a jar is removably mountable to the base on the mounting surface. The jar includes a closed end and an actuator is mounted proximate the closed end. The jar sensor detects the presence of the actuator when the jar is mounted to the base in an operating position. The motor is powered when the jar sensor detects the presence of the actuator in the operating position. A motor temperature indicator is positioned on a control panel on the base and a temperature sensor is in communication with the motor temperature indicator. First and second cordsets are adaptable for removable mounting to the base for powering the motor.

3 Claims, 7 Drawing Sheets

U.S. PATENT DOCUMENTS

| | | |
|---|---|---|
| D204,117 S | 3/1966 | DiSesa |
| D204,224 S | 3/1966 | Gantz et al. |
| 3,472,491 A | 10/1969 | Feder |
| 3,493,214 A | 2/1970 | Edwards et al. |
| 3,901,484 A | 8/1975 | Ernster |
| 3,931,619 A | 1/1976 | Moore et al. |
| 4,071,789 A | 1/1978 | Ernster et al. |
| 4,371,118 A | 2/1983 | Sontheimer et al. |
| 4,741,482 A | 5/1988 | Coggiola et al. |
| 4,815,983 A | 3/1989 | Erickson et al. |
| 4,822,172 A | 4/1989 | Stottmann |
| 4,839,830 A | 6/1989 | Amey et al. |
| 5,013,158 A | 5/1991 | Tarlow |
| 5,071,077 A | 12/1991 | Arroubi et al. |
| 5,273,358 A | 12/1993 | Byrne et al. |
| 5,397,382 A | 3/1995 | Anderson |
| 5,655,834 A | 8/1997 | Dickson |
| 5,726,911 A | 3/1998 | Canada et al. |
| 5,852,968 A | 12/1998 | Sundquist |
| 5,865,383 A | 2/1999 | Ford et al. |
| 5,957,577 A | 9/1999 | Dickson et al. |
| D415,384 S | 10/1999 | Littmann |
| D421,362 S | 3/2000 | Arcidiacono et al. |
| 6,086,395 A | 7/2000 | Lloyd et al. |
| 6,109,977 A | 8/2000 | Baxter et al. |
| 6,200,155 B1 | 3/2001 | Chudkosky et al. |
| 6,227,888 B1 | 5/2001 | Hahn |
| D444,344 S | 7/2001 | Barthelemy et al. |
| 6,364,522 B2 | 4/2002 | Kolar et al. |
| 6,402,365 B1 | 6/2002 | Wong |
| 6,499,873 B1 | 12/2002 | Chen |
| D473,422 S | 4/2003 | Chiappetta et al. |
| D473,749 S | 4/2003 | Pascotti |
| 6,616,324 B1 | 9/2003 | Planca et al. |
| 6,632,013 B2 | 10/2003 | Wulf et al. |
| 6,703,587 B2 | 3/2004 | Sena et al. |
| D491,416 S | 6/2004 | Pascotti |
| 6,758,592 B2 | 7/2004 | Wulf et al. |
| 6,793,167 B2 | 9/2004 | Karkos, Jr. et al. |
| 6,805,312 B2 | 10/2004 | Capp |
| 7,018,091 B2 | 3/2006 | Arroubi et al. |
| 2001/0040911 A1 | 11/2001 | Rubenstein |
| 2002/0009017 A1 | 1/2002 | Kolar et al. |
| 2002/0107589 A1 | 8/2002 | Grimm |
| 2002/0130783 A1 | 9/2002 | Hogan |
| 2004/0120215 A1 | 6/2004 | Huang et al. |
| 2005/0045615 A1 | 3/2005 | Sanoner et al. |
| 2005/0162113 A1* | 7/2005 | Fujimoto et al. ............ 318/434 |
| 2005/0276158 A1 | 12/2005 | Thomas |
| 2006/0007779 A1 | 1/2006 | Fernandez et al. |
| 2006/0086843 A1 | 4/2006 | Lin et al. |
| 2008/0144696 A1 | 6/2008 | Bruggeman et al. |
| 2008/0221739 A1 | 9/2008 | Pryor et al. |

OTHER PUBLICATIONS

Hamilton Beach Commercial Bar Blender Tango (2005) 2 pages.
Nonfinal Office Action, mailed Mar. 11, 2011 in U.S. Appl. No. 11/682,022 , 16 pages.

* cited by examiner

DURABILITY MONITORING AND IMPROVEMENT OF A BLENDER

This application is a divisional of application Ser. No. 11/682,022, filed Mar. 5, 2007, and a continuation of application Ser. No. 12/795,173, filed Jun. 7, 2010.

BACKGROUND OF THE INVENTION

The present application is directed to a blender and, more particularly, to a blender that includes a jar presence indicator, a motor temperature indicator, various types of cordsets to adapt the blender to regional power requirements and additional features to monitor or impact the durability of the blender.

Blenders are a relatively common household and commercial kitchen appliance that are used to blend foodstuff, typically liquid drinks, drinks having ice or related foodstuff, which is blended into a semi-fluid state. A typical blender includes a base that encloses a motor and a jar having a lid that is removably mountable to the base. The jar includes a blending tool rotatably mounted therein. The blending tool is rotatably engageable with a drive shaft of the motor in a working configuration. Food is placed into the jar and the jar is engaged with the base for subsequent blending by driving the blending tool to rotate within the foodstuff. The jar is removable from the base to pour the blended foodstuff into a container for subsequent consumption.

It would be desirable for a blender to include a device that limits or prohibits operation of the blender when the jar is not properly mounted to the base and provides an indication to a user when the jar is properly mounted to the base. Operation of the motor and motor shaft when the jar is not properly mounted to the base may damage components of the blender or create a potential hazard as exposed, rotating parts may injure a user if the jar is not properly mounted to the base. Therefore, it would be desirable to construct a blender that does not operate when the jar is not properly mounted to the base and provides a visual indication to a user when the jar is properly mounted to the base indicating that the blender is ready for use.

It would also be desirable to include a visual motor temperature indicator on a blender to alert the user to the motor temperature. Continuous heavy-duty use of a blender or blending of difficult to blend or viscous foodstuff may place a heavy burden on a blender motor. Blender users are typically unaware if a blender motor becomes overheated or reaches a temperature that can reduce the useful lifetime of the motor or otherwise permanently damage the motor. Therefore, it would be desirable to construct a blender that provides a motor temperature indication to the user such that the user is informed when the motor is operating in a predetermined, normal temperature range and may allow the motor to cool or seek technical help with the blender before permanent damage occurs to the motor if the motor is operating outside of the normal temperature range.

Further, it would be desirable to develop a blender that is adaptable for use in numerous regions without a necessity to significantly modify the assembly and construction of the blender to accommodate regional cordsets. The standards for cordsets in various regions of the world are variable. Accordingly, blenders are often designed and constructed for use in a specific region with a specific standard cordset. Design, development and construction of a blender that may be quickly and easily adapted for several worldwide regions by removal and replacement of a cordset that is utilized as a standard for the specific region where the blender will be sold and used is desirable.

BRIEF SUMMARY OF THE INVENTION

Briefly stated, a preferred embodiment of the present application is directed to a blender for blending foodstuff including a base enclosing a motor and a jar sensor secured to the base. The base has an upper mounting surface and the motor is mounted beneath the upper mounting surface. The jar sensor is secured to the base proximate the upper mounting surface. A jar is removably mountable to the base on the mounting surface. The jar includes a closed end and an actuator is mounted proximate the lower jar surface. The jar sensor detects the presence of the actuator when the jar is mounted to the base in an operating position. The motor is powered when the jar sensor detects the presence of the actuator in the operating position.

In another aspect, the present application is directed to a blender for blending foodstuff including a base enclosing a motor, a control panel located on the base, a jar removably mountable to the base, a motor temperature indicator positioned on the control panel and a temperature sensor positioned proximate the motor. The temperature sensor is in communication with the motor temperature indicator. The motor temperature sensor senses a temperature of the motor, provides a temperature signal to the temperature indicator and the temperature indicator provides an indication to a user of the temperature of the motor.

In a further aspect, the present application is directed to a blender for blending foodstuff including a base enclosing a motor and a jar removably mountable to the base. The base includes a cord mounting outlet. A first cordset is removably mountable to the cord mounting outlet for providing electrical power to the motor when the first cordset is mounted to the cord mounting outlet. A second cordset is removably mountable to the cord mounting outlet for providing electrical power to the motor when the second cordset is mounted to the cord mounting outlet.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings, an embodiment which is presently preferred. It should be understood, however, that the invention is not limited to the precise arrangements and instrumentalities shown. In the drawings.

DETAILED DESCRIPTION OF THE INVENTION

Figure 1:
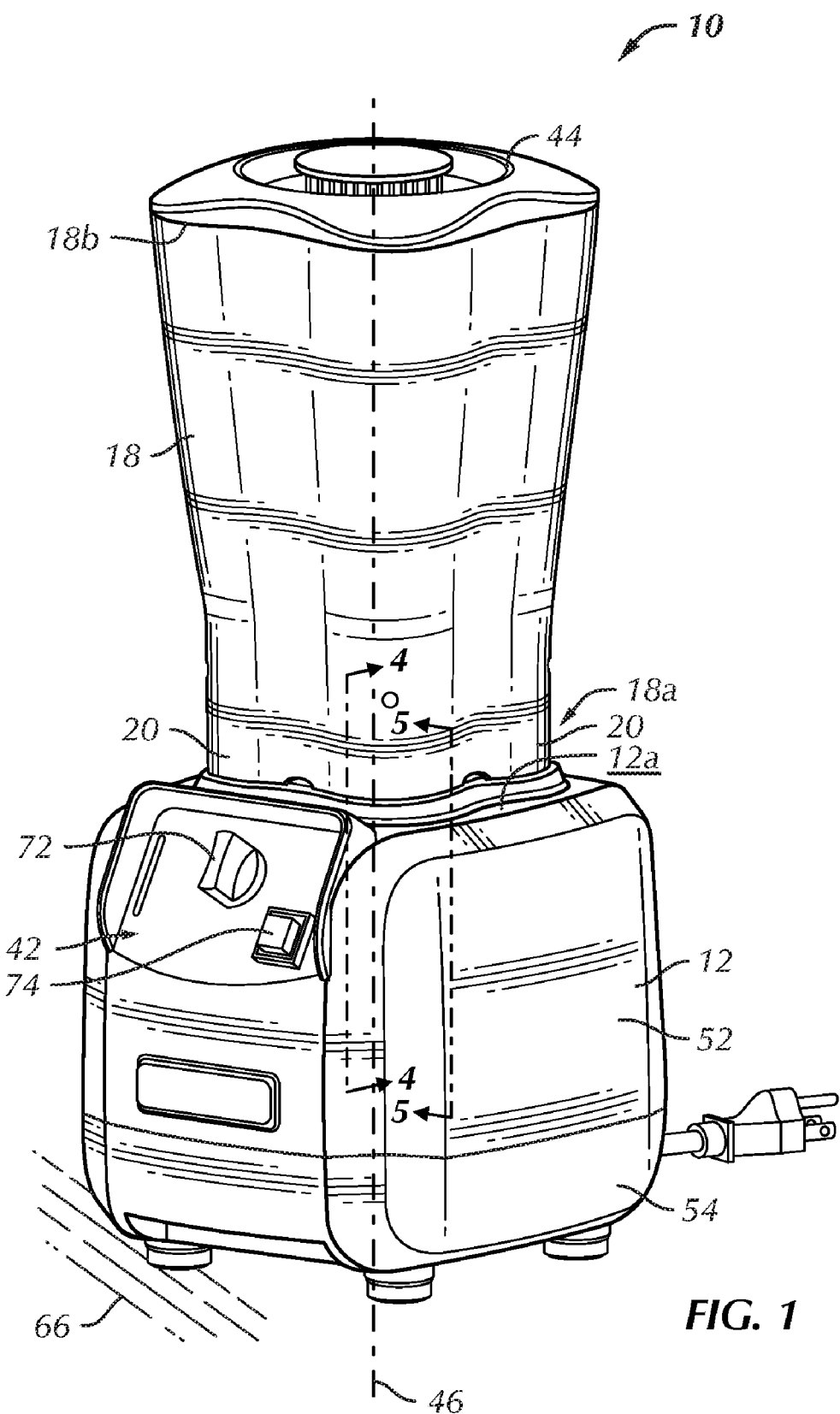
FIG. 1 is a front perspective view of a preferred embodiment of the blender of the present invention.

Certain terminology is used in the following description for convenience only and is not limiting. The words "right", "left", "lower" and "upper" designate directions in the drawing to which reference is made. The words "inwardly" and "outwardly" refer to directions toward and away from, respectively, a geometric center of the blender and designated parts therefore. Terminology includes the above-listed words, derivatives thereof and words of similar import.

Referring to the drawings in detail, wherein like numerals indicate like elements throughout, there is shown in FIGS. 1-8, a preferred embodiment of a blender, generally designated 10, for blending foodstuff.

Referring to FIGS. 1, 2, 4 and 5, the blender 10 includes a base 12 enclosing a motor 14 wherein the base 12 includes an upper mounting surface 12*a*. A jar sensor 16 is secured to the base 12 proximate the upper mounting surface 12*a*. In the preferred embodiment, the jar sensor 16 is mounted within the base 12 at an underside of the upper mounting surface 12*a* of the base 12. The jar sensor 16 is not limited to being mounted to the underside of the upper mounting surface 12*a* or to being mounted to the base 12 and may be mounted to nearly any portion of the blender 10 wherein power may be provided to the jar sensor 16 and the jar sensor 16 may be utilized to sense a presence of a jar 18 of the blender 10, which will be described in greater detail below.

Referring to FIGS. 1, 2 and 4-6, the jar 18 is removably mountable to the base 12 on the mounting surface 12*a* and includes a closed end 18*a*. In the preferred embodiment, the jar 18 also includes an open mouth 18*b* opposite the closed end 18*a* and a handle 18*c* extending from a side surface that a user may utilize to manipulate the jar 18. The jar 18 may have nearly any size and/or shape that includes a closed end 18*a* and is able to receive food therein for blending.

Referring to FIGS. 1, 2, 5 and 6, in the preferred embodiment, the jar 18 includes four spaced apart hollow feet 20 at the closed end 18*a* and the base 12 includes four spaced apart protrusions 22 extending from the upper mounting surface 12*a* proximate the four corners of the base 12. In an operating position (FIGS. 1, 4 and 5), at least a portion of each of the protrusions 22 is positioned within a corresponding one of the feet 20. The preferred feet 20 are formed by arcuate walls at the closed end 18*a* of the jar 18. In addition, the preferred protrusions 22 are integrally formed with the upper mounting surface 12*a* of the base 12 and extend generally perpendicularly from the upper mounting surface 12*a*. The positioning of the protrusions 22 in the feet 20 provide alignment for the jar 18 relative to the base 12 and aid in limiting movement of the jar 18 relative to the base 12 in the operating position. The jar 18 is not limited to including the feet 20 constructed of the arcuate-shaped portions at the closed end 18*a* and the base 12 is not limited to inclusion of the protrusions 22 extending generally perpendicularly from the upper mounting surface 12*a*. For example, the jar 18 may not include the feet 20 but may be associated with a removable collar (not shown) that is removably mountable to the base 12 and serves to align the jar 18 relative to the base 12. In addition, the jar 18 may be aligned and secured relative to the base 12 in numerous other manners, such as through generally cylindrical-shaped hollow feet extending from the bottom of the jar that engage generally solid protrusions extending from the base, as would be apparent to one having ordinary skill in the art.

Referring to FIGS. 2 and 4-6, in the preferred embodiment, the motor 14 includes a motor shaft 24 that is driven by the motor 14 and a male drive coupling 26 is mounted to an exposed end 24*a* of the motor shaft 24. In addition, a jar shaft 28 is rotatably mounted to a bottom wall 18*d* of the closed end 18*a* of the jar 18 and a blender blade 30 is mounted to a first end 28*a* of the jar shaft 28. A female drive coupling 32 is preferably mounted to a second end 28*b* of the jar shaft 28 and receives the male coupling 26 in the operating position. The arrangement of the jar shaft 28 mounted in the bottom wall 18*d* of the jar 18 including the female coupling 32 at the second end 28*b* and the male coupling 26 mounted to the motor shaft 24 is not limiting. For example, as was described above, the blender blades 30 may be associated with a separate collar having a conventional blender clutch that is removably mountable to the jar 18 and to the base 12, which also includes a conventional clutch to couple the blender blades 30 to the motor 14. However, the male coupling 26 is preferred at the exposed end 24*a* of the motor shaft 24 for coupling to the female coupling 32 of the jar shaft 28 because the male and female couplings 26, 32 generally provide a more robust mechanical engagement between the motor shaft 24 and the jar shaft 28 when compared to a conventional blender clutch arrangement and any spillage or ingredients that fall or are spilled onto the male coupling 26 are generally easier to clean from the male coupling 26 when compared to the female coupling 32. For example, the exposed surfaces of the male coupling 26 may be wiped using a cloth while the female coupling 32 is generally more difficult to clean on its internal or difficult to reach surfaces and may be inserted into a dishwasher for cleaning with the jar 18 or may be otherwise immersed in fluid for cleaning. In contrast, the base 12 and attached male coupling 26 are typically inappropriate for dishwasher or fluid immersion cleaning because they are fixed to the motor 14.

Figure 2:
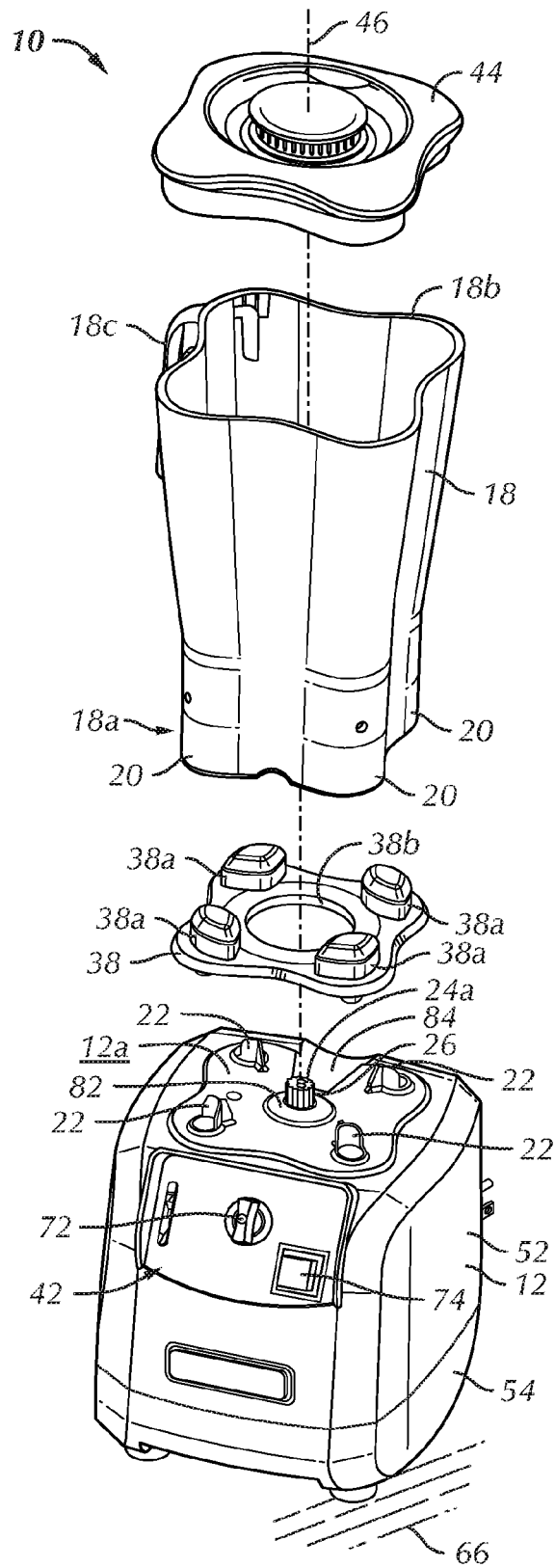
FIG. 2 is a partially exploded, front perspective view of the blender shown in FIG. 1.
Figure 3A:
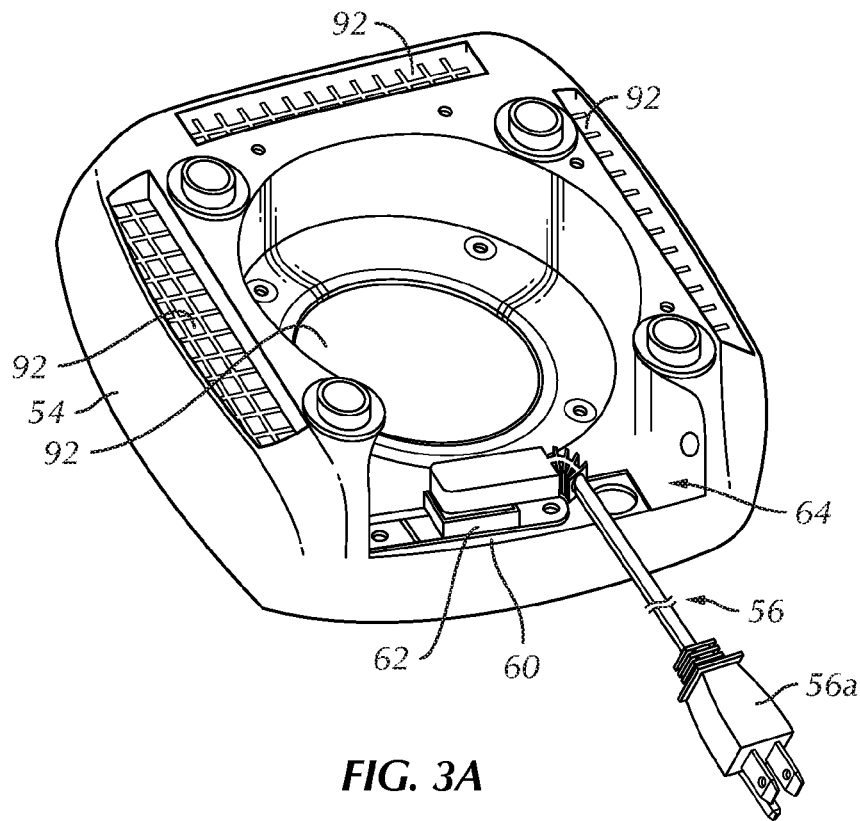
FIG. 3A is a bottom perspective view of a lower housing of a base of the blender shown in FIG. 1, wherein a first cordset is mounted to the lower housing.
Figure 3B:
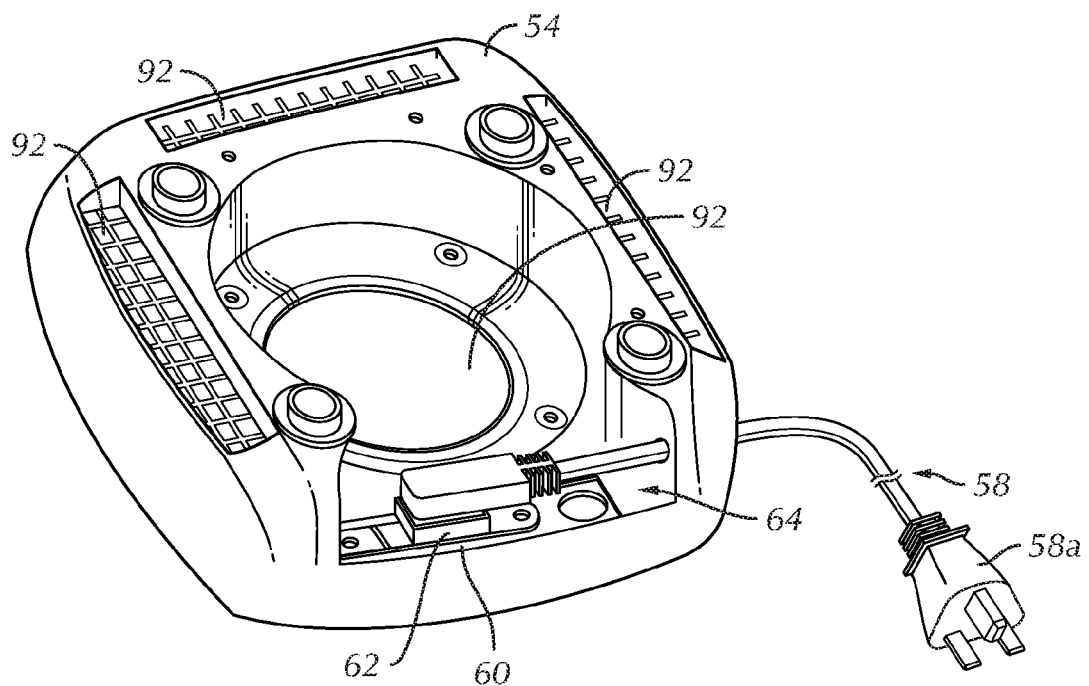
FIG. 3B is a bottom perspective view of the lower housing of the base of the blender shown in FIG. 1, wherein a second cordset is mounted to the lower housing.
Figure 4:
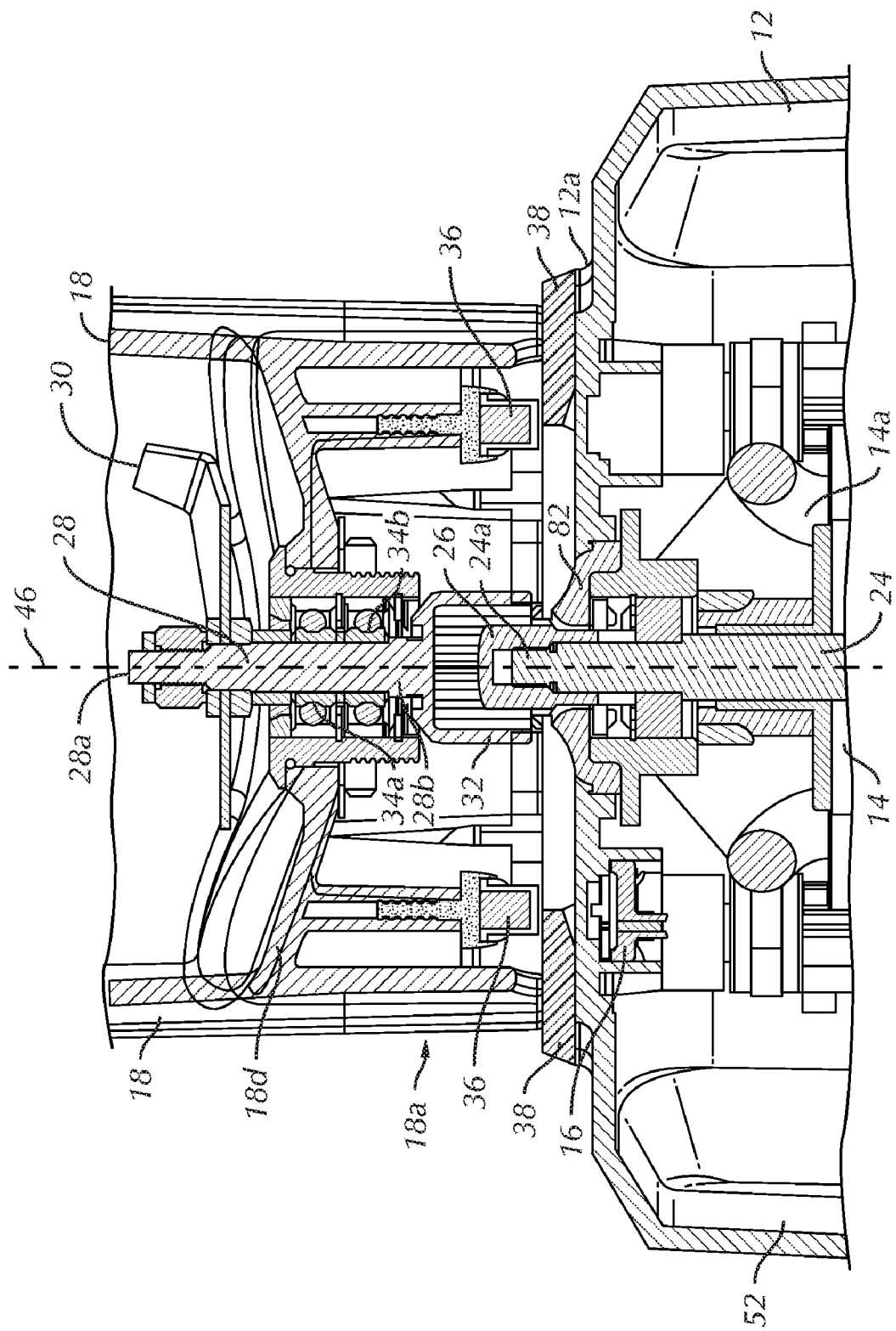
FIG. 4 is a cross-sectional view of a portion of the blender shown in FIG. 1, taken along line 4-4 of FIG. 1.

Referring to FIGS. 2 and 4, in the preferred embodiment, a seal ring 82 is mounted to the base 12 at the upper mounting surface 12*a* and seals with the motor shaft 24 to limit fluid from flowing into the base 12 and onto the motor 14. In addition, a drain channel 84 preferably extends from the seal ring 82 toward a peripheral edge of the upper mounting surface 12*a* to direct fluid that is positioned near the male coupling 26 away from the penetration where the motor shaft 24 extends out of the base 12. The combination of the seal ring 82 and the drain channel 84 cooperate to limit standing fluid near the male coupling 26 that may seep into the base 12. Fluid that flows into the base 12 and onto the motor 14 is typically detrimental to the operation and durability of the motor 14 and may cause failure of the motor 14 or electronics associated with the blender 10. The blender 10 may also include additional seals within the base 12 that seal with the motor shaft 24 to further direct fluid away from the motor 14 or blender electronics even if some fluid is able to breach the upper mounting surface 12 and seep through the seal ring 82. The blender 10 is not limited to inclusion of the seal ring 82 or the drain channel 84 on the upper mounting surface and may have a generally planar upper mounting surface 12*a* without the seal ring 82 or may include alternative or additional sealing and draining mechanisms to limit seepage of fluids into the base 12. For example, the motor 14 may include seals (not shown) at motor bearing locations to limits exposure of the motor 14 to fluids.

Referring to FIG. 4, in the preferred embodiment, the jar shaft 28 is rotatably mounted to the closed end 18*a* and through the bottom wall 18*d* by a first bearing 34*a* and a second bearing 34*b*. The first and second bearings 34*a*, 34*b* provide additional stability for the jar shaft 28 and additional structural strength and stiffness for blending when compared to a conventional jar shaft, which is mounted to a jar using a single bearing. In addition, the first and second bearings 34*a*, 34*b* are able to distribute loads encountered by the jar shaft 28 and the blender blades 30 more effectively to the bottom wall 18*d* and the jar 18. Accordingly, the blades 30 are generally more stable during high load blending operations and tend to have an extended life when compared to conventional blender blades, which are mounted to the jar using a single bearing. The blender 10 is not limited to inclusion of the first and second bearings 34*a*, 34*b* and may include a single bearing that mounts the jar shaft 28 to the bottom wall 18*d* or may be part of an assembly that is separate from the jar 18, for example, the above-described collar.

Figure 6:
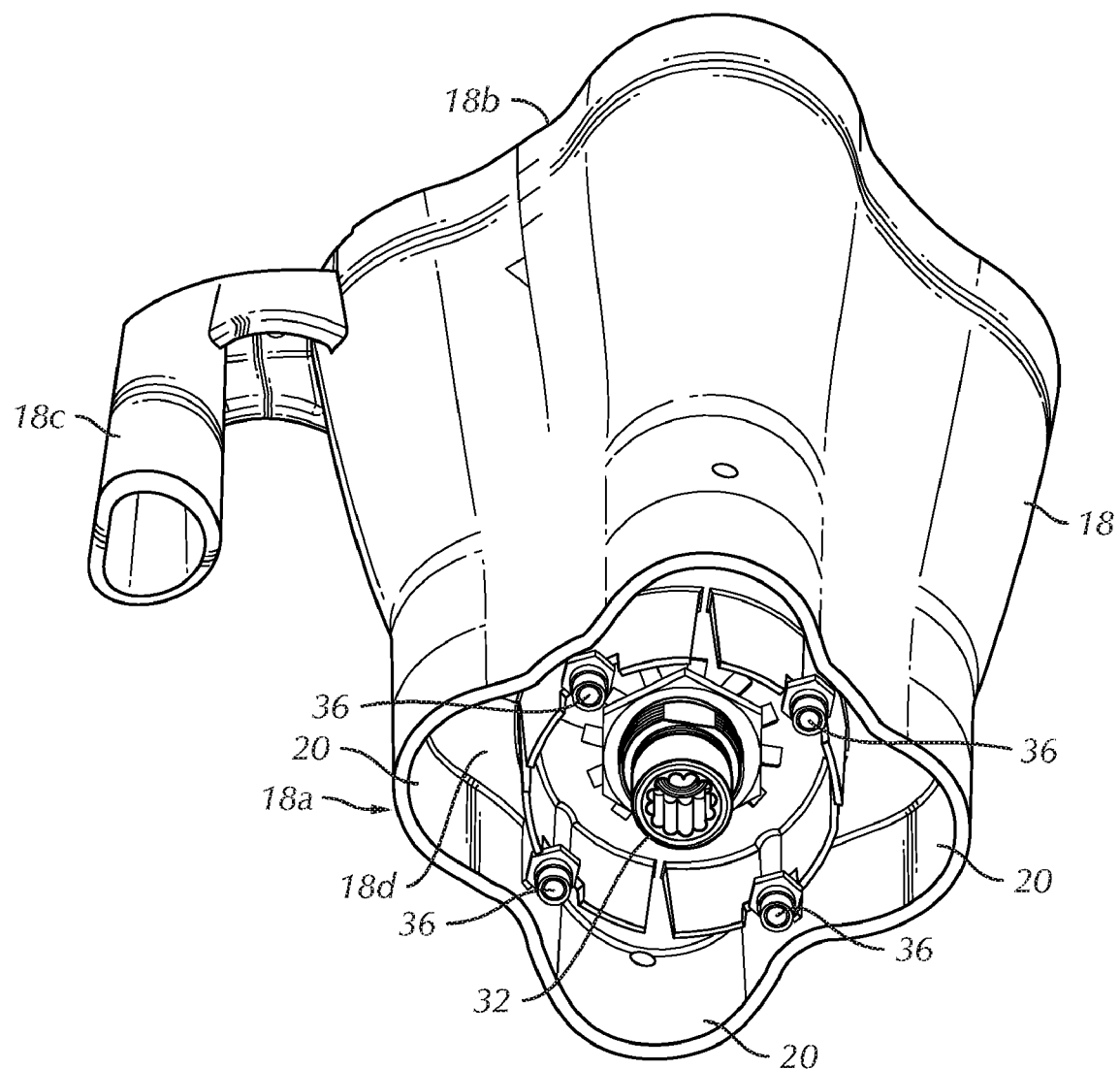
FIG. 6 is a bottom perspective view of a jar of the blender shown in FIG. 1.

Referring to FIGS. 4 and 6, an actuator 36 is mounted proximate the closed end 18*a* of the jar 18. The jar sensor 16 detects the presence of the actuator 36 when the jar 18 is mounted to the base 12 in an operating position. The motor 14 is powered when the jar sensor 16 detects the presence of the actuator 36 in the operating position. In the preferred embodiment, the actuator 36 is comprised of a magnet mounted to the jar 18 at the closed end 18*a* and the jar sensor 16 is comprised of a Hall Effect sensor 16 mounted to the base 12 proximate the upper mounting surface 12*a* for detecting the presence of the magnetic field of the magnetic actuator 36. The actuator 36 is not limited to being comprised of a magnet and the jar sensor 16 is not limited to being comprised of the Hall Effect sensor. The actuator 36 and jar sensor 16 may be comprised of nearly any set of mechanisms that are able to detect whether the jar 18 is properly mounted to the base 12. For example, the base 12 may include an optical sensor or sensors therein that detects when the jar 18 is properly mounted on the upper mounting surface 12*a* or the blender 10 may include nearly any other mechanism that permits detection of the positioning of the jar 18 relative to the base 12 in the operating position.

Referring to FIGS. 2 and 4-6, in the preferred embodiment, the actuator 36 is comprised of at least one magnet mounted between two adjacent feet 30 and the jar sensor 16 is secured to the base 12 between at least two adjacent protrusions 22. The preferred construction of the blender 10 includes four magnet actuators 36 mounted between each of four adjacent feet 30 at the closed end 18*a* of the jar 18 and the jar sensor 16 is mounted between two adjacent protrusions 22 of four protrusions 22 that extend from the upper mounting surface 12*a*. The inclusion of the four magnet actuators 36 mounted between the feet 20 and the single Hall Effect sensor 16 mounted in the base 12 between the protrusions 22 permit the jar 18 to be mounted in any of four orientations relative to the base 18 in the operating position wherein the jar sensor 16 senses one of the actuators 36 when the jar 18 is properly positioned relative to the base 12 in the operating position. The blender 10 is not limited to inclusion of the four magnetic actuators 36 mounted to the closed end 18*a* of the jar 18 or to the single jar sensor 16 mounted within the base 18. For example, the jar 18 may include a single actuator 36 and a single jar sensor 16, thereby potentially limiting the jar 18 to a single proper operating position relative to the base 18. In addition, the jar 18 may include a single actuator 36 and the base 12 may include four jar sensors 16 mounted between the protrusions 22 within the base 12 to sense the proper positioning of the jar 18 relative to the base 12 in four separate positions. However, the single Hall Effect sensor 16 mounted in the base 12 and the four magnetic actuators 36 mounted between the feet 20 are preferred due to the relative simplicity, operability and cost effectiveness of this design and construction.

Figure 5:
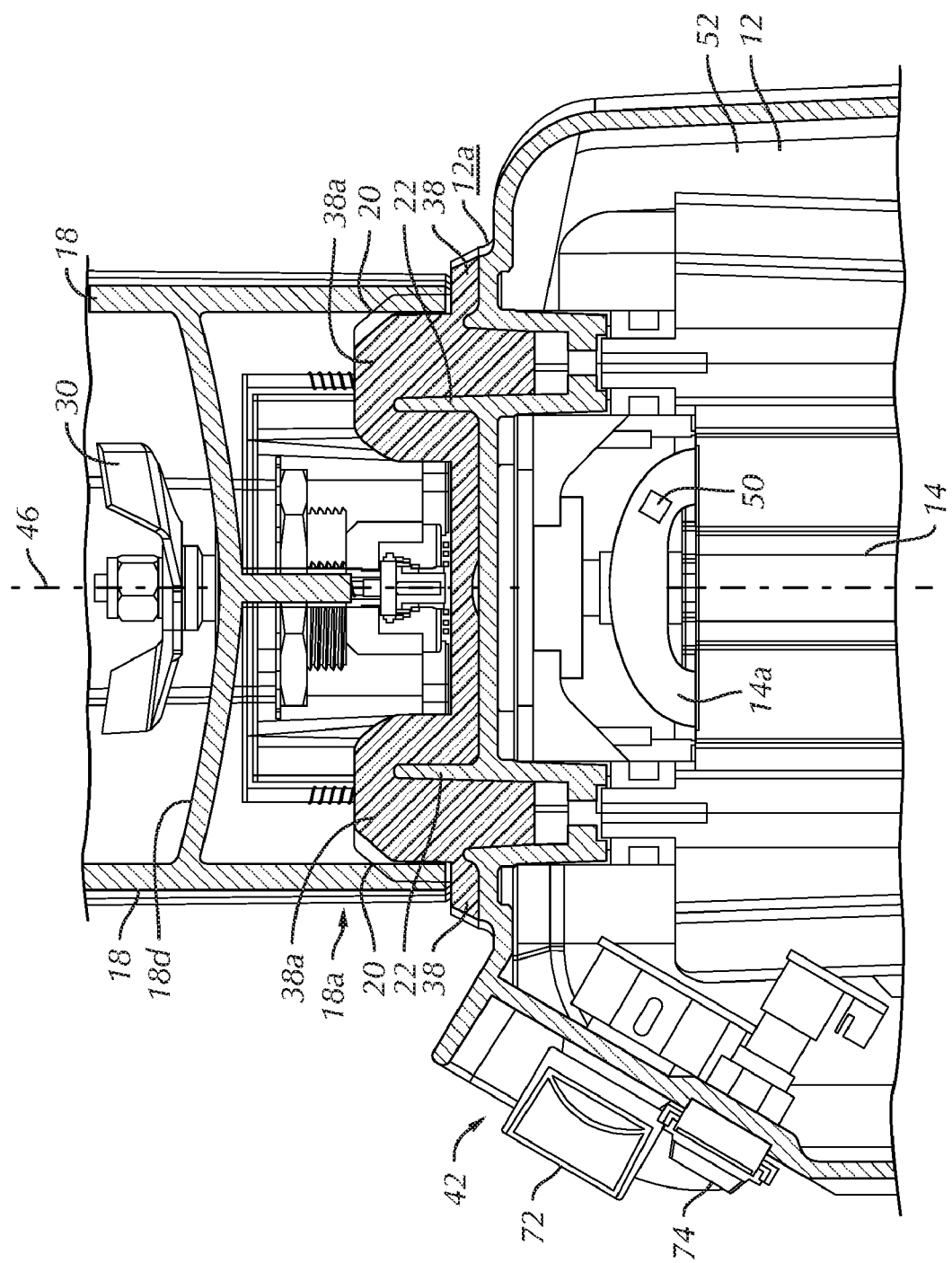
FIG. 5 is a cross-sectional view of a portion of the blender shown in FIG. 1, taken along line 5-5 of FIG. 1.

Referring to FIGS. 2, 4 and 5, in the preferred embodiment, a jar pad 38 constructed of a polymeric material is removably mountable to the upper mounting surface 12*a*. The polymeric material of the jar pad 38 is preferably an elastic material and the jar pad 38 preferably includes four receiving extensions 38*a*. The jar pad 38 is preferably mounted between the jar 18 and the base 12 in the operating position and generally provides a vibration damper and a relatively forgiving, elastic structure between the generally rigid jar feet 20 of the jar 18 and the protrusions 22. The four receiving extensions 38*a* are aligned with the base 12 by receiving the protrusions 22 and aid in aligning the jar 18 relative to the base 12 through positioning within the feet 20 in the operating position. The elastic material of the jar pad 38 provides a relatively flexible, pliable material for aligning the jar 18 relative to the mounting surface 12*a*. The jar pad 38 also preferably includes a central opening 38*b* that permits extension of the male coupling 26 therethrough in the operating position. The jar pad 38 is preferably removably mountable relative to the base 12 and the jar 18 for separate cleaning, for example, in a dishwasher. In addition, the Hall Effect sensor 16 and the magnetic actuators 36 are operable through the jar pad 38, as the Hall Effect sensor 16 is able to detect the change in magnetic field when one of the magnetic actuators 36 is positioned proximate the jar sensor 16 in the operating position.

Figure 7:
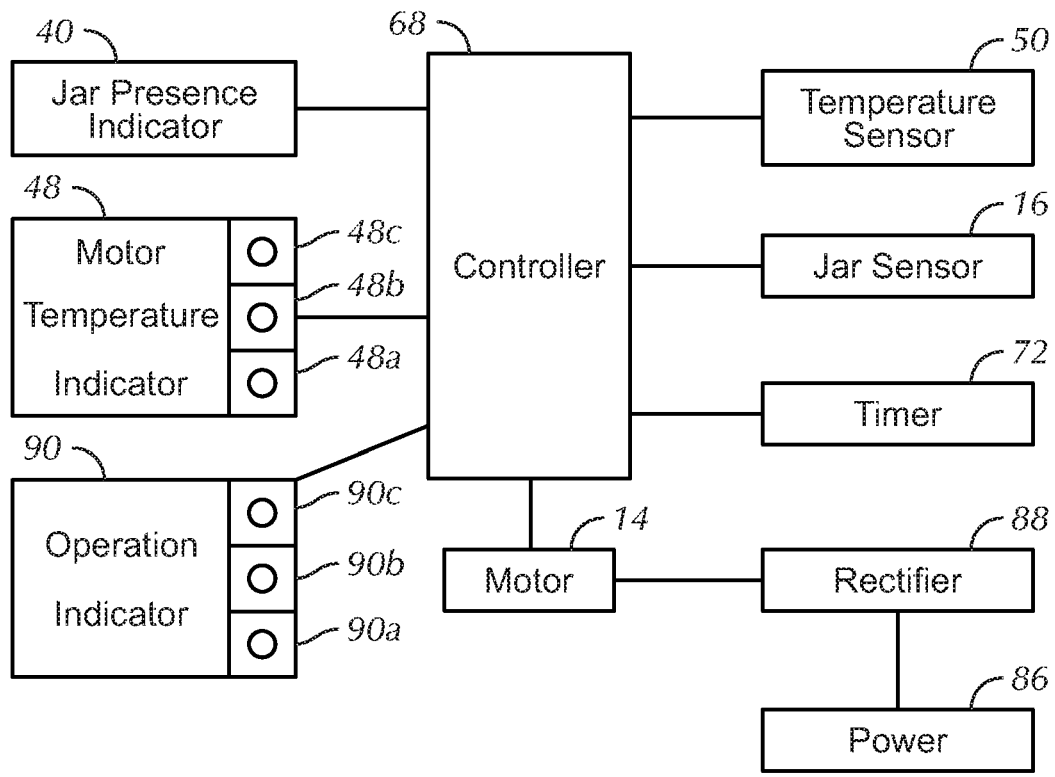
FIG. 7 is schematic block diagram of control elements of the blender shown in FIG. 1.
Figure 8:
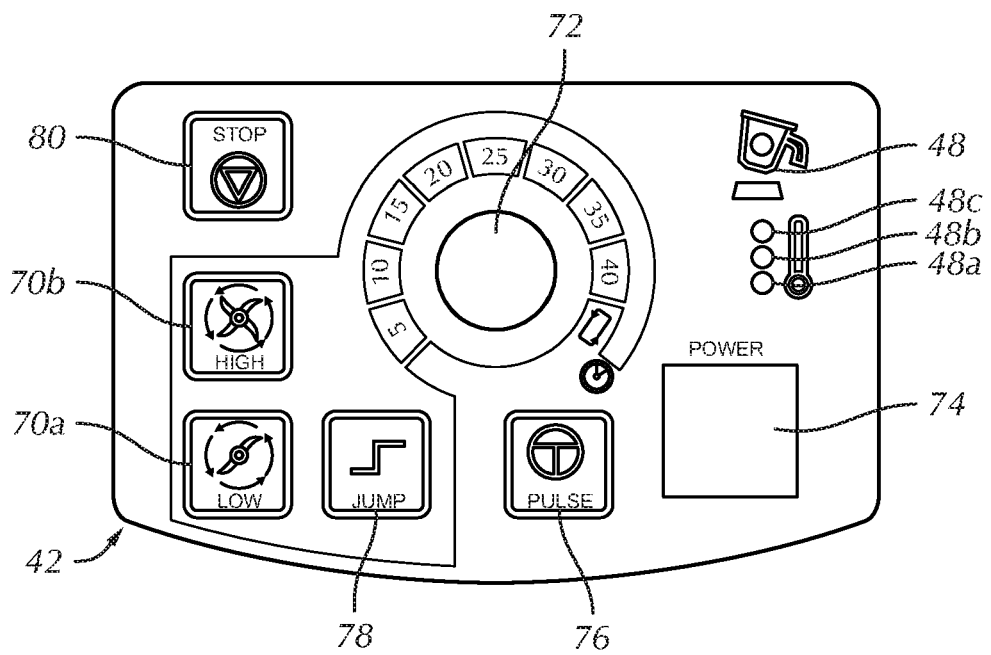
FIG. 8 is a front elevational view of a preferred control panel of the blender shown in FIG. 1.

Referring to FIGS. 1, 2, 4, 7 and 8, in the preferred embodiment, the base 12 includes a control panel 42 having a jar presence indicator 40 thereon. In operation, the jar sensor 16 preferably provides a signal to a controller 68, which in turn provides a signal to the jar presence indicator 40, and the jar presence indicator 40 provides an indication to a user when the jar 18 is mounted to the base 12 in the operating position. The preferred jar presence indicator 40 is comprised of a light emitting diode (LED) that is mounted to the control panel 42 and is illuminated in the operating position. The blender 10 is not limited to inclusion of the jar presence indicator 40 comprised of the LED and may not include any jar presence indicator 40 or may include an alternative visual, audible or alternative indicator that provides an indication to the user that the jar 18 is mounted to the base 12 in the operating position. In addition, the control panel 42 shown in FIG. 8 is not limiting and may include nearly any configuration and appearance that provides a panel from which a user is able to control the operation of the blender 10. The preferred details of the control panel 42 are shown in FIG. 8 with a generic control panel shown in FIGS. 1, 2 and 5 for convenience and clarity.

Referring to FIGS. 1, 2 and 6-8, in the preferred embodiment, the jar sensor 16 is in communication with the jar presence indicator 40 through the controller 68. The controller 68 is preferably comprised of an integrated circuit 68 and is utilized to control various operations of the blender 10. The controller 68 preferably receives the signal from the jar sensor 16 indicating that the jar 18 is mounted to the base 12 in the operating position, permits power to flow to the motor 14 and illuminates the jar presence indicator 40, providing notice to a user that the jar 18 is mounted in the operating position relative to the base 12. Conversely, if the jar 18 is not properly mounted to the base 12, the jar presence indicator 40 is not illuminated and power is not provided to the motor 14 by the controller 68. Accordingly, the blender 10 is preferably not operable when the jar 18 is not mounted to the base 12 in the operating position or when the male coupling 26 is exposed from the base 12. The configuration of the controller 68, the jar sensor 16, the actuators 36 and the jar presence indicator 40 limit use of the blender 10 when the jar 18 is not mounted to the base 12 in the operating position.

Referring to FIGS. 1, 2 and 4-8, in operation, the jar pad 38 is mounted to the mounting surface 12*a* by engaging the extensions 38*a* with the protrusions 22. The jar 18 is placed in the operating position by positioning the extensions 38*a* in the hollows of the feet 20. The elastic nature of the jar pad 38 and, specifically, the extensions 38*a*, facilitate positioning of the jar 18 relative to the base 12 by providing a forgiving, elastic surface where the generally rigid feet 20 engage the jar pad 38, thereby limiting potential impact damage at the closed end 18*a* of the jar 18. When the jar 18 is positioned in the operating position relative to the base 12, one of the magnetic actuators 36 is located proximate, above the jar sensor 16. The preferred Hall Effect sensor 16 is able to detect the presence of the magnetic field of the magnetic actuator 36 and provides a signal to the controller 68, which in turn provides a signal to the jar presence indicator 40 to illuminate. The jar presence indicator 40 or LED is illuminated to provide an indication to the user that the jar 18 is properly aligned with the base 12 in the operating position and the blender 10 may be utilized. If the jar 18 is not properly positioned in the operating position, the motor 14 will not be provided with power and the blender 10 will not be operable. A lid 44 is mounted to the mouth 18*b* of the jar 18 and the foodstuff within the jar 18 is blended by actuating the motor 14 to drive the blending blades 30.

Referring to FIGS. 1, 2, 7 and 8, when the jar 18 is mounted in the operating position relative to the base 12, the user may select a low or high operating speed utilizing a low speed button 70*a* or a high speed button 70*b*, respectively. A blending time is selected utilizing a timer 72 and blending is commenced by depressing a start button 74. The blender 10 typically operates or blends the foodstuff until the selected time period ends and the controller 68 automatically cuts power to the motor 14 to stop blending. The blender 10 may be momentarily started again by depressing a pulse button 76, which results in operation of the blender 10 for as long as the pulse button 76 is depressed by the user. Further, during timed operation, a jump button 78 may be depressed to cause the blender 10 to jump back and forth between the high and low blending speeds, which are initially selected using the low and high buttons 70*a*, 70*b*. The timer 72 may also be set at a continuous operation setting which causes the blender 10 to operate without time limitation after the start button 74 is depressed until a stop button 80 is depressed or the jar 18 is moved from the operating position, resulting in a signal from the jar sensor 16 to the controller 68 that the jar 18 is not in the operating position, a signal from the controller 68 to cut power to the motor 14 and the controller 68 turning the jar presence indicator 40 off to indicate to the user that the jar 18 is not longer in the operating position.

As was described above, the jar 18 may be positioned in four distinct orientations relative to the base 12 in the preferred embodiment. Specifically, regardless of which one of the feet 20 engages a specific extension 38*a* or protrusion 22, one of the magnetic actuators 36 will be located proximate or above the Hall Effect sensor 16. That is, regardless of which ninety degree) (90°) incremental orientation the handle 18*c* of the jar 18 is located relative to the base 12 with respect to a longitudinal axis 46 of the blender 10, the jar 18 will be in the operating position and the jar presence indicator 40 will be illuminated. The ability to position the jar 18 in the four distinct orientations relative to the base 12 is convenient for a user who may be located at various positions relative to the base 12 during use and orienting the handle 18*c* at a preferred position for relatively easy access by the user is preferred for convenience. The jar 18 is not limited to four specific orientations relative to the base 12 and may be positioned at nearly any location or orientation relative to the base 12 wherein the proper positioning of the jar 18 relative to the base 12 may be accurately monitored by a presence indicating device.

Referring to FIGS. 1, 2, 5, 7 and 8, a motor temperature indicator 48 is positioned on the control panel 42 and a temperature sensor 50 is positioned proximate the motor 14. The temperature sensor 50 is in communication with the temperature indicator 48, preferably through the controller 68, and senses a temperature of the motor 14 during use. The temperature sensor 50 provides a temperature signal to the temperature indicator 48, preferably through the controller 68, and the temperature indicator 48 provides an indication to a user of the temperature of the motor 14.

In the preferred embodiment, the motor temperature indicator 48 is comprised of a first indicator 48*a*, a second indicator 48*b* and a third indicator 48*c*. The first, second and third indicators 48*a*, 48*b*, 48*c* are preferably comprised of LEDs that are alternatively illuminated depending upon the temperature of the motor 14 sensed by the temperature sensor 50. Specifically, in the preferred embodiment, the first indicator 48*a* is illuminated when the temperature signal is within a predetermined low range, the second indicator 48*b* is illuminated when the temperature signal is within a predetermined medium range and the third indicator 48*c* is illuminated when the temperature signal is within a predetermined high range. The preferred low range is comprised of a sensed temperature that is at or below approximately seventy-five degrees Centigrade (75° C.), the preferred medium range is a sensed temperature between approximately seventy-six and ninety-nine degrees Centigrade (76-99° C.) and the high temperature range is a sensed temperature approximately at or greater than one hundred degrees Centigrade (100° C.). The low, medium and high temperature ranges are not limited to those described above and may be comprised of nearly any temperature range, depending upon the type and acceptable operating temperature range of a specific motor 14, the location and responsiveness of the temperature sensor 50, the duration that the motor 14 is subjected to the sensed temperatures and various other factors. Preferably, the controller 68 cuts power to the motor 14 when the sensed temperature reaches a predetermined level, for example, the high temperature range, such that permanent damage to the motor 14 is limited from exposure to excessive heat.

The controller 68 preferably prevents operation of the motor 14 when the temperature signal from the temperature sensor 50 is in the high range, but preferably permits a no-load or reduced load operation cycle of the blender 10 to quickly cool the motor 14. For example, when the temperature sensor 50 sends a signal to the controller 68 that the motor temperature is in the high range, the controller 68 stops the motor 14 and sends a signal to the third indicator 48*c* to illuminate and provide an indication to the user that the motor 14 has reached a temperature in the high range. In this over-temperature situation, the user is preferably able to select a relatively long time setting using the timer 72, select a low motor rotating speed using the low speed button 70*a* and quickly remove the jar 18 from the base 12, resulting in the controller 68 permitting the motor 14 to operate at the low speed for the relatively long blending time to cool the motor 14. The blender 10 is not limited to inclusion of this cool-down cycle to cool the motor 14 when a sensed temperature is in the high range, but the cycle is preferred to provide a relatively quick method to cool the motor when a high temperature is sensed.

Referring to FIGS. 5 and 7, in the preferred embodiment, the temperature sensor 50 is comprised of a thermistor that is secured to a coil 14a of the motor 14 by a conductive potting material (not shown). The temperature sensor 50 is not limited to being comprised of the thermistor mounted to the coil 14 utilizing the potting material and may be comprised of an optical temperature sensor that is mounted to the base 12 and detects a temperature of a portion of the motor 14 other than the coil 14a and sends temperature signals to the controller 68 at predetermined intervals. However, mounting the thermistor to the coil 14a with potting material is preferred due to the reliability, economical assembly and ability of the thermistor to communicate with the controller 68.

Referring to FIGS. 1, 7 and 8, the preferred LED's of the first, second and third indicators 48a, 48b, 48c are preferably comprised of green, yellow and red LED's, respectively that provide the indication to the user of the temperature of the motor 14. The green, yellow and red LED's are preferred because they provide a generally universal indication of a user that the temperature is acceptable in the low range by illuminating the green first indicator 48a, the motor temperature is operating in a cautionary range in the medium range by illuminating the yellow second indicator 48b and the motor temperature is operating in a dangerous or unsafe range in the high range by illuminating the red third indicator 48c. The blender 10 is not limited to inclusion of the green, yellow and red first, second and third indicators 48a, 48b, 48c comprised of LED's and may be comprised of nearly any device that is able to provide an indication to a user of the temperature of the motor 14 or whether the motor is operating in an acceptable temperature range.

The blender 10 is not limited to inclusion of the motor temperature indicator 48 or the temperature sensor 50 and may be operated without either of these components without significantly impacting the function of the blender 10. In addition, when the motor temperature indicator 48 and temperature sensor 50 are included with the blender 10, the motor temperature indicator 48 is not limited to the first, second and third indicators 48a, 48b, 48c comprised of LEDs and may be comprised of nearly any visual, audible or other indication that provides a prompt or indication to the user of the temperature of the motor 14. For example, the temperature indicator 48 may be comprised of a digital display that specifically exhibits the sensed temperature of the motor 14 or may be comprised of an array of LEDs that provide an indication of the temperature of the motor 14. Further, the motor temperature indicator 48 may be comprised of an audible signal, for example, a verbal temperature signal, indicating the temperature of the motor 14.

Referring to FIGS. 1-8, in operation, the motor 14 is powered to drive the blending blades 30 and the blades 30 and motor 14 are loaded through resistance to rotation of the blades 30, which is typically provided by the foodstuff within the jar 18 that is being blended. Under high loading conditions or other circumstances, the motor 14 may become excessively hot. Excessive heat applied to the motor 14 may have negative impacts upon the life and general operation of the motor 14. Accordingly, the temperature sensor 50 is able to sense the temperature of the motor 14 and the sensed temperature is communicated to the user through the motor temperature indicator 48. Specifically, the thermistor 50 senses a temperature of the coil 14a, the controller 68 receives the sensed temperature and compares the sensed temperature to the predetermined temperature ranges and sends a signal to the appropriate temperature indicator 48a, 48b, 48c to provide the temperature indication to the user. When the motor temperature becomes excessively high, the third indicator 48c is preferably illuminated, indicating to the user that the blender 10 should not be operated or the blender 10 should be referred for maintenance and the controller 68 may cut power to the motor 14. Alternatively, during normal operation, the thermistor 50 senses a temperature of the motor 14 that falls within the low or medium ranges and the sensed temperature is communicated to the motor temperature indicator 48, through the controller 68, which sends a signal to illuminate one of the first or second indicators 48a, 48b. Indication of the operating temperature of the motor 14 through the motor temperature indicator 48 may provide a useful diagnostic tool for the operator to indicate that maintenance of the blender 10 is required, that the blender 10 is operating normally or that the blender 10 should be shut down to analyze the loading or general operation.

Referring to FIGS. 1-3B, the base 12 includes an upper housing 52 and a lower housing 54 having a cord mounting outlet 60 on a lower surface. A first cordset 56 and a second cordset 58 are removably mountable to the cord mounting outlet 60 for providing electrical power to the motor 14 when the first or second cordsets 56, 58 are mounted to the cord mounting outlet 60. The first cordset 56 preferably includes an American-type male plug 56a at a distill end and a second cordset 58 preferably includes a European-type male plug 58a at a distill end. The first and second cordsets 56, 58 also preferably include a mounting plate 62 at a proximal end opposite the distal end that is removably mountable to the cord mounting outlet 60 on the lower housing 54. The cord mounting outlet 60 is preferably positioned in a cord cavity 64 in the lower surface of the lower housing 54 to accommodate positioning of the base 12 on a support surface 66 without interference of the mounting plate 62 with the support surface 66. The mounting plates 62 of the first and second cordsets 56, 58 are preferably identical in their mounting mechanism for mounting to the cord mounting outlet 60 such that the first and second cordsets 56, 58 are interchangeable with the cord mounting outlet 60. Accordingly, the blender 10 may be constructed for use in nearly any country and the appropriate cordset 56, 58 may be mounted to the mounting plate 62 depending upon where the blender 10 is to be shipped for use.

The first and second cordsets 56, 58 are not limited to inclusion of the American-type and/or European-type male plugs 56a, 58a on the distal end and may include nearly any manner or type of male plug for use in a specific region. The male plugs 56a, 58a of the first and second cordsets 56, 58 may have nearly any configuration that is adapted for plugging into an outlet that the blender 10 may be utilized with for providing power to the motor 14.

Referring to FIG. 7, in the preferred embodiment, the motor 14 is a universal motor 14, which may be operated on either direct current (DC) or alternating current (AC) from a power source 86. The blender 10 is typically subjected to AC from the power source 86 and includes a rectifier 88 to convert the AC to DC. The universal motor 14 typically operates at a greater efficiency and at a lower temperature when subjected to DC. Accordingly, the rectifier 88 is preferred such that the motor 14 operates in an efficient manner and at a comparatively low temperature. Accordingly, the universal motor 14 will typically have a longer life when subjected to the rectified current of the preferred embodiment. The blender 10 is not limited to inclusion of the rectifier 88 or to the inclusion of the universal motor 14. The blender 10 may include nearly any type of motor 14 and may be operated without the rectifier 88 without significantly impacting the function of the blender 10. However, the rectifier 88 is preferred to improve the efficiency and durability of the blender 10.

Referring to FIGS. 3A, 3B, 7 and 8, in the preferred embodiment, the blender 10 includes an operation indicator 90 that is in communication with the controller 68. The operation indicator 90 preferably provides an indication to a user of the number of times that power is removed and applied to the blender 10 and motor 14 during the lifetime of the blender 10. The counting of the number of times that the blender 10 has been operated is useful for blender warranty purposes, troubleshooting, general durability and other related purposes that would be apparent to one having ordinary skill in the art. In the most preferred embodiment, the operation indicator 90 is comprised of three LED's including a first counter indicator 90a, a second counter indicator 90b, and a third counter indicator 90c that are mounted to the base 12. The counter indicators 90a, 90b, 90c preferably provide a visual indication to a user of the number of times that the blender 10 has been used during its lifetime. The number of times the blender 10 is used is preferably calculated and stored by the controller 68. In addition, in the preferred embodiment, the counter indicators 90a, 90b, 90c are mounted within the base 12 and their illumination is visible through vents 92 in the lower housing 54. The counter indicators 90a, 90b, 90c are not limited to being comprised of LED's, mounted within the base 12 or visible through the vents 92 and may be comprised of a digital display or other indicating device, mounted to the control panel 42 or nearly anywhere else on the blender 10 or may be separate from the blender 10 and selectively placed into communication with the controller 68 to provide an indication to a user of the number of times that the blender 10 has been operated during its lifetime.

In operation, the blender 10 is operated a plurality of times during its lifetime and the controller 68 records and stores each time power is removed from and applied to the blender 10. The controller 68 preferably provides a signal to the operation indicator 90 of the number of operation cycles that the blender 10 has encountered each time the blender 10 is powered or each time the start button 74 is depressed. In the preferred embodiment, each time the start button 74 is depressed, the controller 68 sends a signal to the operation indicator 90 and the operation indicator 90 provides a signal or indication to a user of the number of times the blender 10 has been operated during its lifetime. Specifically, the first counter indicator 90a is preferably green, the second counter indicator 90b is preferably yellow and the third counter indicator 90c is preferably red. Upon receipt of the signal from the controller 68, the third counter indicator 90c preferably blinks once for every ten thousand cycles, the second counter indicator 90b blinks once for every thousand cycles and the first counter indicator 90a blinks once for every one hundred cycles. Accordingly, if the blender 10 has been subjected to 21, 334 cycles during its lifetime, the third counter indicator 90c blinks twice, the second counter indicator 90b blinks once and the first counter indicator 90a blinks three times. As was described above, the counter indicators 90a, 90b, 90c are not limited to colored LED's that blink to provide an indication to a user of the number of cycles the blender 10 has encountered and may be comprised of nearly any mechanism that is able to provide a signal to a user of the number of cycles the blender 10 has encountered. For example, the operation indicator 90 may be comprised of a mechanical counter mounted to the control panel 42, a speaker that audibly indicates the number of cycles when prompted by a user or a digital display that displays the number of cycles and is in remote communication with the controller 68 to indicate to the user the number of cycles.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A method of operating a blender having a jar including blending blades therein, a base, a motor mounted within the base, a controller and a temperature sensor, the method comprising the steps of:
   a) positioning foodstuff in the jar;
   b) mounting the jar to the base such that the blending blades are in mechanical communication with the motor;
   c) operating the motor to rotate the blending blades within the foodstuff and blend the foodstuff;
   d) sensing a temperature of the motor with the temperature sensor;
   e) communicating the temperature of the motor to the controller;
   f) comparing the sensed temperature of the motor to a predetermined high temperature range using the controller, the controller sending a signal to the motor to cancel operation of the motor when the sensed temperature of the motor is within the predetermined high temperature range; and
   g) operating the motor at a rotating speed in a reduced mechanical load cycle to cool the motor.

2. The method of claim 1 comprising the further step of:
   h) removing the jar from the base at the start of step (g) such that the motor is then operating in the reduced mechanical load cycle.

3. The method of claim 1 wherein in step (g) a rotating speed is selected utilizing a speed selection button and a time period is selected utilizing a timer, the controller directing the motor to operate at the rotating speed for the time period.

* * * * *